United States Patent
Geiss et al.

(10) Patent No.: US 9,154,697 B2
(45) Date of Patent: Oct. 6, 2015

(54) CAMERA SELECTION BASED ON OCCLUSION OF FIELD OF VIEW

(71) Applicant: Google Inc., Mountain View, CA (US)

(72) Inventors: Ryan Geiss, San Jose, CA (US); Roman Lewkow, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/098,796

(22) Filed: Dec. 6, 2013

(65) Prior Publication Data

US 2015/0163400 A1 Jun. 11, 2015

(51) Int. Cl.
H04N 5/232 (2006.01)
H04N 5/247 (2006.01)

(52) U.S. Cl.
CPC ........... *H04N 5/23229* (2013.01); *H04N 5/247* (2013.01)

(58) Field of Classification Search
CPC ........................... H04N 5/23229; H04N 5/247
USPC ................... 348/143, 169, 333.04–333.12
See application file for complete search history.

(56) References Cited

U.S. PATENT DOCUMENTS

| | | | |
|---|---|---|---|
| 7,957,581 B2 | 6/2011 | Wu | |
| 7,986,343 B2 | 7/2011 | Kumagai et al. | |
| 8,134,589 B2 | 3/2012 | Border et al. | |
| 8,553,106 B2 | 10/2013 | Scarff | |
| 2005/0129324 A1 | 6/2005 | Lemke | |
| 2007/0132874 A1* | 6/2007 | Forman et al. ........... | 348/333.02 |
| 2007/0159535 A1* | 7/2007 | Kumagai et al. ........... | 348/218.1 |
| 2008/0030592 A1 | 2/2008 | Border et al. | |
| 2010/0092107 A1* | 4/2010 | Mochizuki et al. ........... | 382/309 |
| 2011/0010626 A1* | 1/2011 | Fino et al. ...................... | 715/727 |
| 2011/0122308 A1 | 5/2011 | Duparre | |
| 2012/0056982 A1 | 3/2012 | Katz et al. | |
| 2012/0075489 A1 | 3/2012 | Nishihara | |
| 2012/0262572 A1 | 10/2012 | Cudak et al. | |
| 2013/0076649 A1 | 3/2013 | Myers et al. | |
| 2013/0106850 A1 | 5/2013 | Endo | |

FOREIGN PATENT DOCUMENTS

| | | |
|---|---|---|
| JP | 11-272855 A | 10/1999 |
| JP | 2007-305050 A | 11/2007 |

(Continued)

OTHER PUBLICATIONS

Low, Aloysius; CNET article titled "Corephotonics' dual-camera tech will change smartphone imaging" dated Feb. 27, 2014.

(Continued)

*Primary Examiner* — Mekonnen Dagnew
(74) *Attorney, Agent, or Firm* — McDonnell Boehnen Hulbert & Berghoff LLP

(57) ABSTRACT

An example method involves: (a) receiving image data that is generated by each of a plurality of image-capture systems, wherein the plurality of image-capture systems are all arranged on a given device and all are oriented in substantially the same direction, (b) analyzing, by the computing system, image data that is generated by one or more of the image-capture systems to select image data from at least one of the image-capture systems having a field-of-view that is not substantially occluded by an unintended element, and (c) storing the selected image data.

19 Claims, 8 Drawing Sheets

(56) References Cited

FOREIGN PATENT DOCUMENTS

| | | |
|---|---|---|
| KR | 10-2010-0013700 A | 2/2010 |
| WO | 2010147609 | 12/2010 |
| WO | 2012042704 | 5/2012 |

OTHER PUBLICATIONS

International Search Report and Written Opinion issued in International Application No. PCT/US2014/068504, mailed on Mar. 6, 2015, 14 pages.

* cited by examiner

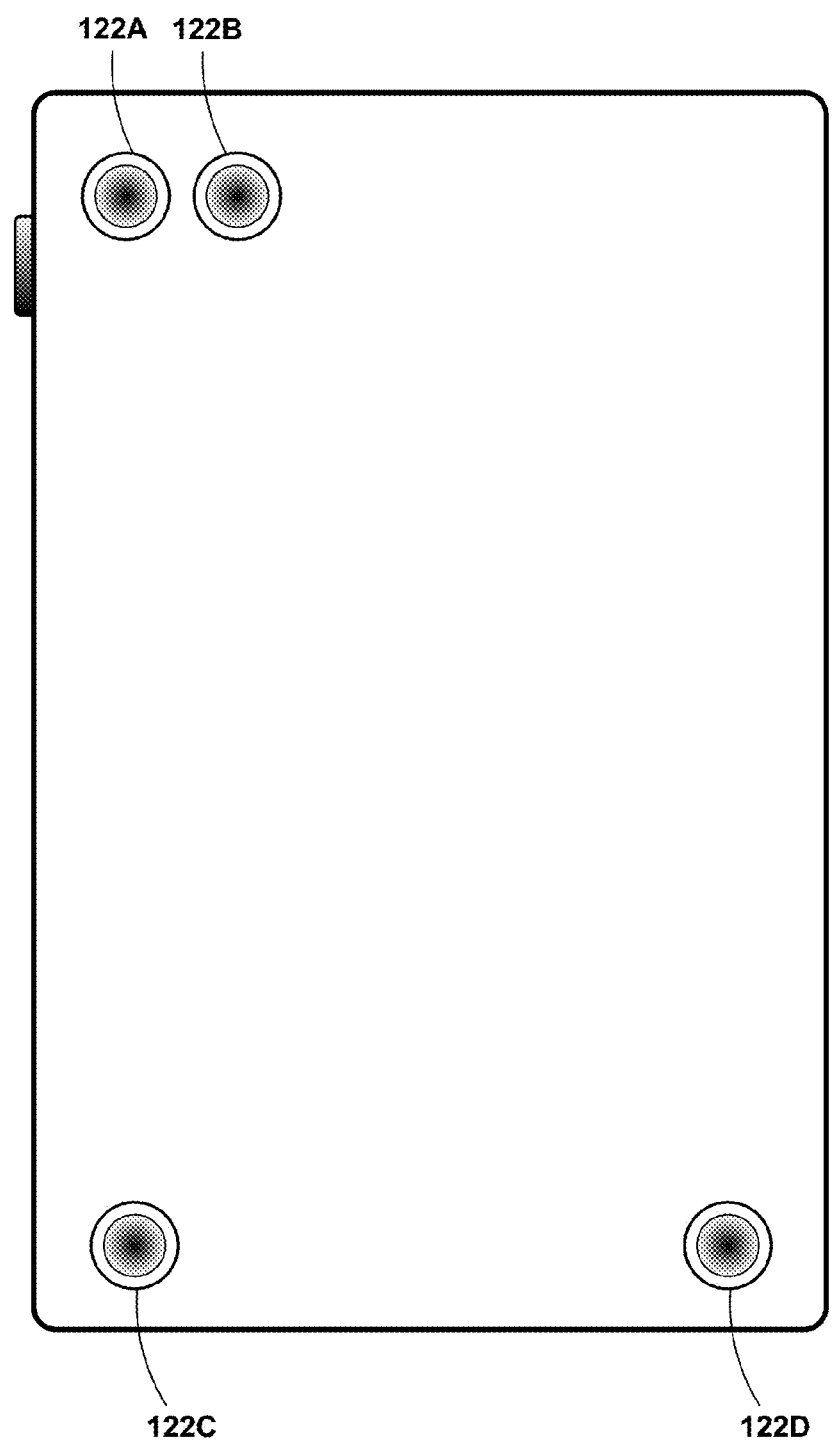

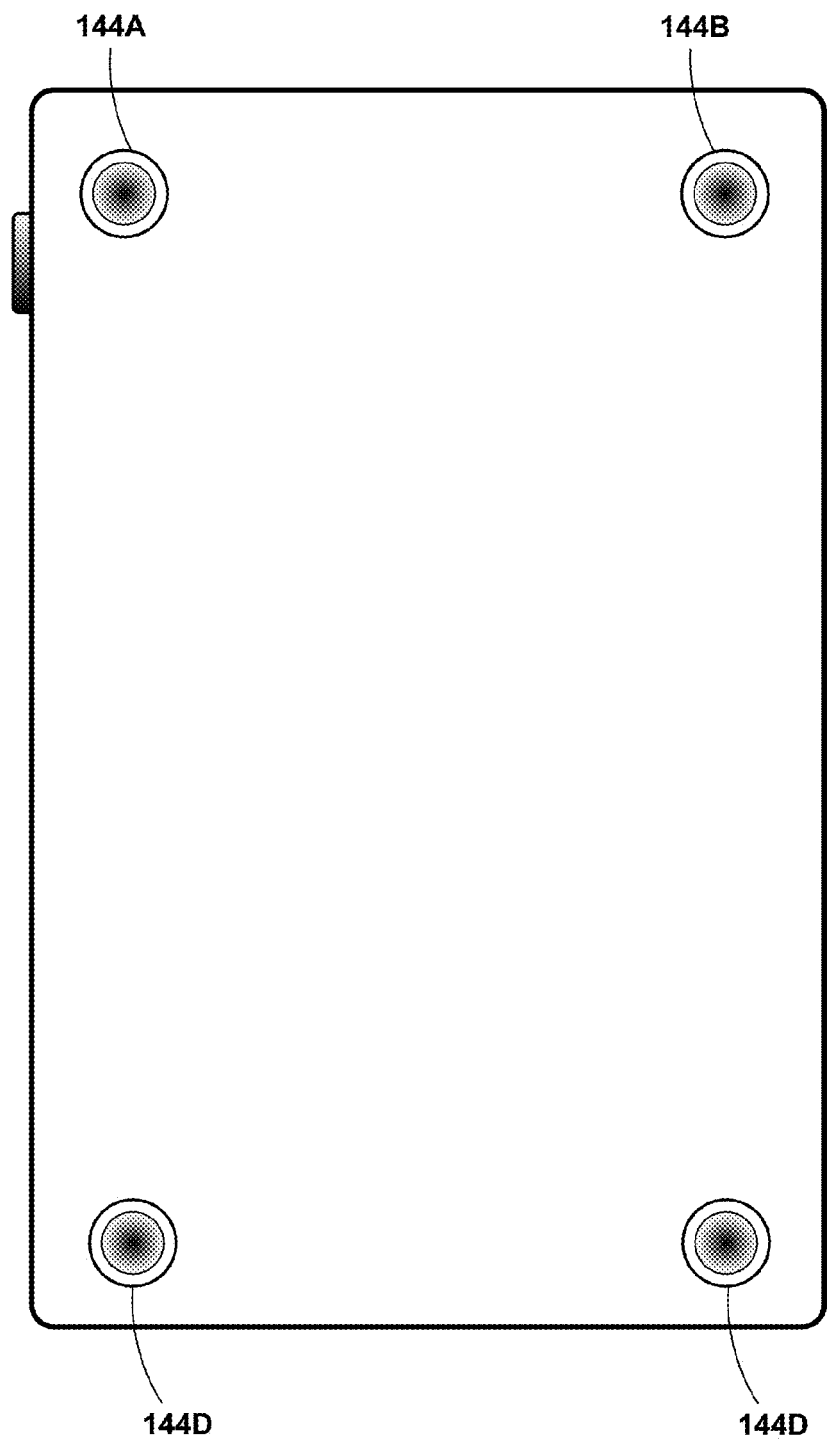

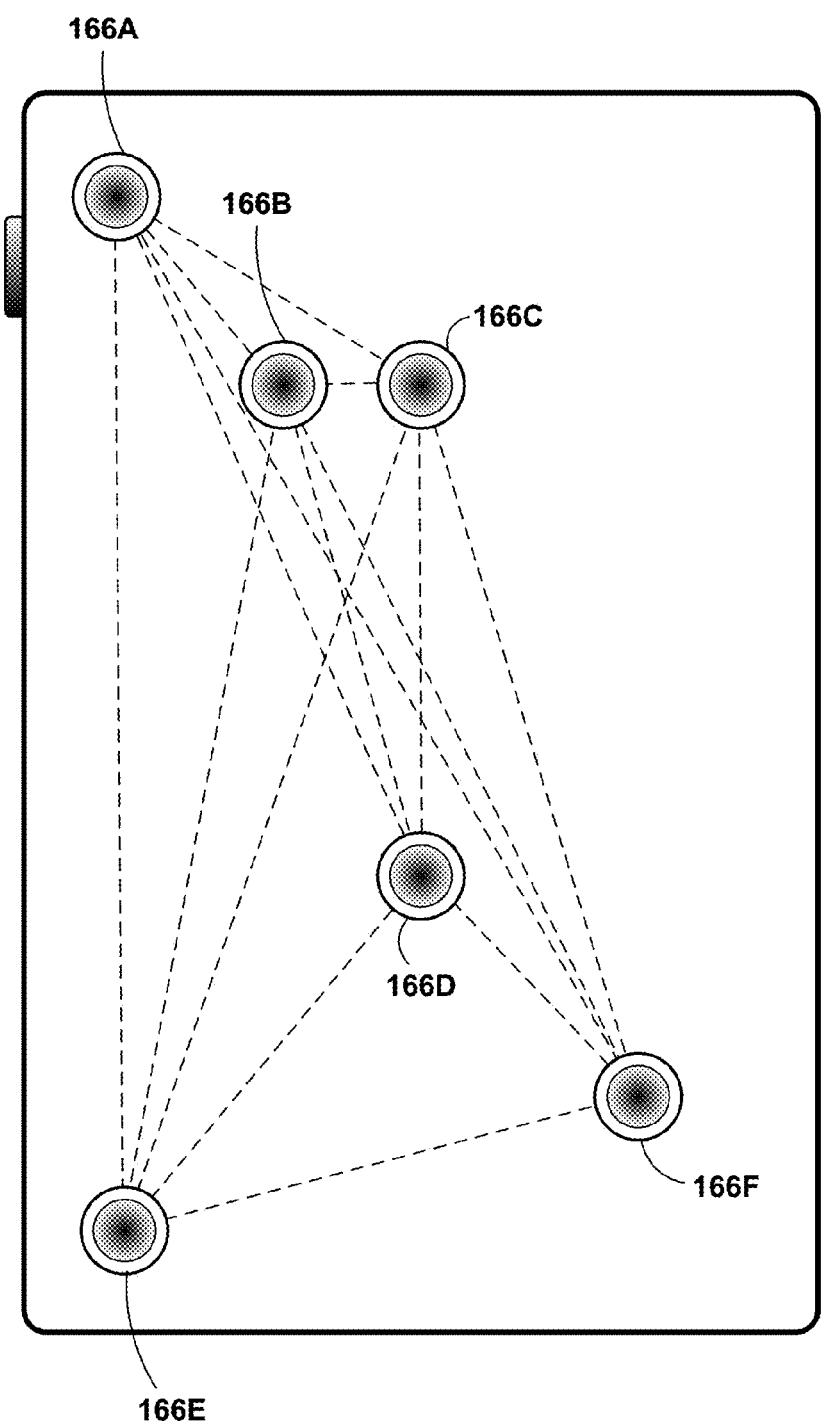

CAMERA SELECTION BASED ON OCCLUSION OF FIELD OF VIEW

BACKGROUND

Generally, imaging may refer to capturing and representing the color and brightness characteristics of a real-world environment in a digital format and/or a film format (e.g., in photographs and/or motion video). A large variety of image capture devices exist, thus providing consumers with numerous ways to capturing image data.

As image capture devices, such as cameras, become more popular, such devices may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

SUMMARY

Example embodiments may take the form of, be implemented by, or otherwise relate to a device, such as s mobile phone, which included two or more camera systems that are oriented in the same direction and separated by some distance. In an example embodiment, a device may acquire image data of a scene from multiple cameras, and evaluate the different images of the scene to detect when occlusion of a camera's lens has occurred. By doing so, the device may avoid capturing, using, and/or storing images where; e.g., the user has inadvertently covered the camera's lens or otherwise blocked the lens' field of view of the scene with their finger, and thus partially or fully occluded the scene they intended to capture. More generally, an example method may be implemented to avoid occlusion of the intended subject by objects other than the user's finger. For instance, example embodiments may help to intelligently avoid the occlusion by subjects that are close to or on the lens of one of a device's cameras, such as dirt or a fingerprint on the lens of the camera. Example embodiments may also be implemented to avoid occlusion by other types of unintended elements that block the line of sight between the lens and an intended subject.

In one aspect, an example method involves a computing system: (a) receiving image data that is generated by each of a plurality of image-capture systems, wherein the plurality of image-capture systems are all arranged on a given device and all are oriented in substantially the same direction, (b) analyzing image data that is generated by one or more of the image-capture systems to select image data from at least one of the image-capture systems having a field-of-view that is not substantially occluded by an unintended element, and (c) storing the selected image data.

In another aspect, an apparatus includes a plurality of image-capture systems, wherein lenses of the image-capture systems are all arranged on a first surface of the apparatus and oriented in substantially the same direction. The apparatus further includes a control system configured to: (a) receive image data that is generated by each of two or more of the plurality of image-capture systems, (b) analyze the image data that is generated by one or more of the image-capture systems to select image data from at least one of the image-capture systems having a field-of-view that is not substantially occluded by an unintended element, and (c) store the selected image data.

In a further aspect, a non-transitory computer readable medium has stored therein instructions that are executable by a computing device to cause the computing device to perform functions comprising: (a) receiving image data that is generated by each of a plurality of image-capture systems, wherein the plurality of image-capture systems are all arranged on a given device and all are oriented in substantially the same direction, (b) analyzing image data that is generated by one or more of the image-capture systems to select image data from at least one of the image-capture systems having a field-of-view that is not substantially occluded by an unintended element, and (c) storing the selected image data.

In a further aspect, a system includes: (a) means for receiving image data that is generated by each of a plurality of image-capture systems, wherein the plurality of image-capture systems are all arranged on a given device and all are oriented in substantially the same direction, (b) means for analyzing image data that is generated by one or more of the image-capture systems to select image data from at least one of the image-capture systems having a field-of-view that is not substantially occluded by an unintended element, and (c) means for storing the selected image data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 1B shows a digital camera device with an arrangement of four cameras oriented in the same direction, in accordance with an example embodiment.

FIG. 1C shows another digital camera device with an arrangement of four cameras oriented in the same direction, in accordance with an example embodiment.

FIG. 1D shows a digital camera device with an arrangement of six cameras oriented in the same direction, in accordance with an example embodiment.

DETAILED DESCRIPTION

Figure 1A:
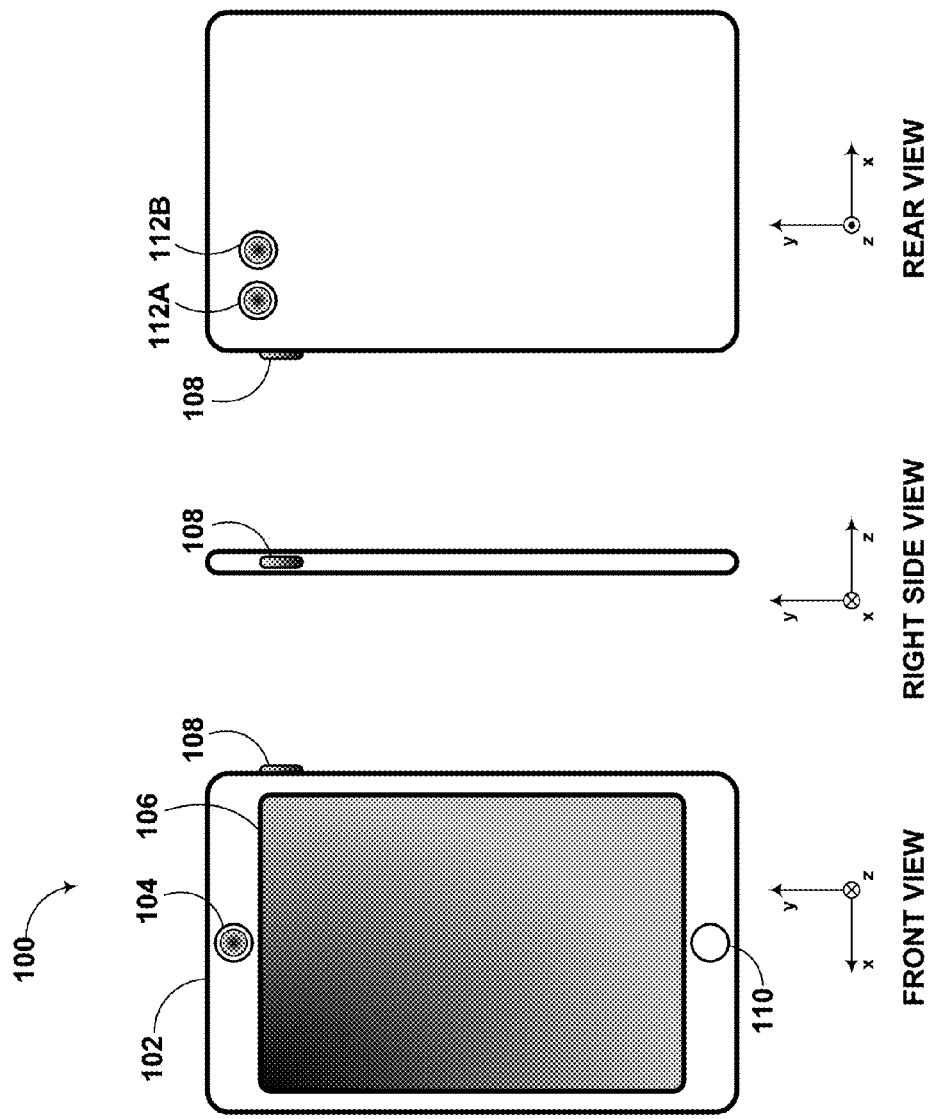
FIG. 1A depicts front, right side, and rear views of a digital camera device, in accordance with an example embodiment.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations, all of which are contemplated herein.

I. OVERVIEW

Many computing devices that serve multiple purposes, such as smartphones and tablet computers, now include cameras. When a camera is included in a device that is not dedicated solely to imaging, such as a smartphone, the ergonomics of the device for use as a camera may be less than desirable.

For instance, consider that the bodies of dedicated point-and-shoot and DSLR cameras are often shaped such that the wearer can easily hold the camera in a comfortable position for capturing still images and/or video. Further, the bodies of such cameras are typically shaped such that when the user holds the camera in a comfortable manner, the user's hands will naturally be outside the field of view of the camera's lens. In contrast, the thin and flat shape of some devices, such as many smartphones, may not provide the same ergonomic benefits as the design of dedicated imaging devices. Further, since the typical smartphone may be difficult to hold in an appropriate position for use as a camera, users may inadvertently block the camera lens with their fingers and/or drop the device while trying to take a picture or video.

An example method may be implemented by a device that includes two or more camera systems, which are oriented in the same direction and separated by some distance. When a user takes a picture (e.g., by pressing a shutter button), a control system may evaluate the perspective of the user's environment captured by each of the device's camera systems to determine whether an intended subject of the image is partially or wholly occluded. The device may then capture an image with the camera (or possibly multiple cameras) having a view of the intended subject that is not occluded.

Alternatively, the device may capture an image of a scene with multiple cameras, and then save only the image (or possibly multiple images) that are substantially free from occlusion (or at least have less occlusion than the other image(s)). In such case, any image in which occlusion is detected may be discarded.

A device may use various techniques to detect occlusion, and in so doing, may use various types of occlusion indicators. For example, a device could compare the sharpness of images of a scene captured by different cameras. More specifically, when an image captures a near-field occluder, such as a finger or dirt on the lens, the near-field occluder will typically be out of focus. As such, an unoccluded image of the scene will typically be sharper, overall, than an image of the scene that is obscured by a near-field occluder. Therefore, if a device detects there is a significant difference in sharpness between different camera's images of the same scene, the device may save or otherwise use the image or images that are the sharpest.

Note that herein, a "camera system" or "image-capture system" may refer to an image-capture device or a camera, a system within a camera, a separate system that is communicatively coupled to a camera, or a combination of a camera and one or more other systems. Further, for sake of simplicity, examples described herein may attribute certain functions and/or characteristics to a "camera" or "camera device." It should be understood that, in many cases, functions and/or characteristics that are attributed to a camera or camera device may likewise be attributed to a camera system, even when this is not stated explicitly.

II. ILLUSTRATIVE SYSTEMS

The physical components of an image capture device may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

A. Devices with Multiple Image-Capture Systems

As noted previously, digital cameras may be standalone devices or integrated with other devices. As an example, FIG. 1A illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Front-facing camera 104 may be positioned on a side of body 102 typically facing a user while in operation, or on the same side as multi-element display 106.

Digital camera device 100 could further include two rear-facing cameras 112A and 112B. Rear-facing cameras 112A and 112B may be positioned on a side of body 102 opposite front-facing camera 104. Note that referring to the cameras as front and rear facing is arbitrary, and digital camera device 100 may include multiple cameras positioned on various sides of body 102. Further, the lenses of rear-facing cameras 112A and 112B are arranged on the upper corner on the back of digital camera device 100, and are oriented in substantially the same direction. (Note that herein, references to a cameras being oriented in the same direction should be understood to mean that the lenses of the cameras point in substantially the same direction.)

It should be understood that other multi-camera arrangements are possible. In particular, the lenses of two or more cameras, which are all oriented in substantially the same direction, may be arranged in different formations on a surface of the phone. For instance, several other multi-camera arrangements are described herein with respect to FIGS. 1B to 1E.

In particular, FIG. 1B shows a mobile device 120 with an arrangement of four cameras 122A to 122D oriented in the same direction, including two cameras 122A and 122B in the upper corner of the mobile device (similar to FIG. 1A), and two additional cameras 122C and 122D that are located at the lower corners of the mobile device 120. Further, FIG. 1C shows another arrangement with four cameras oriented in the same direction. In particular, the arrangement in FIG. 1C includes one camera 144A to 144D in each corner of the device 140.

Yet further, FIG. 1D shows an arrangement with six cameras 166A to 166F facing in the same direction. In FIG. 1D, the six cameras 166A to 166F are placed on the back of the mobile device 160 in less-structured, "organic," arrangement. Note that an arrangement with three or more cameras may provide multiple baselines between different pairs of cameras. For instance, a six-camera arrangement such as that shown in FIG. 1D may provide up to 15 different baselines for, e.g., stereoscopic imaging. More generally, an arrangement of n cameras that are oriented in substantially the same direction may provide up to C(n, k) baselines.

Figure 1E:
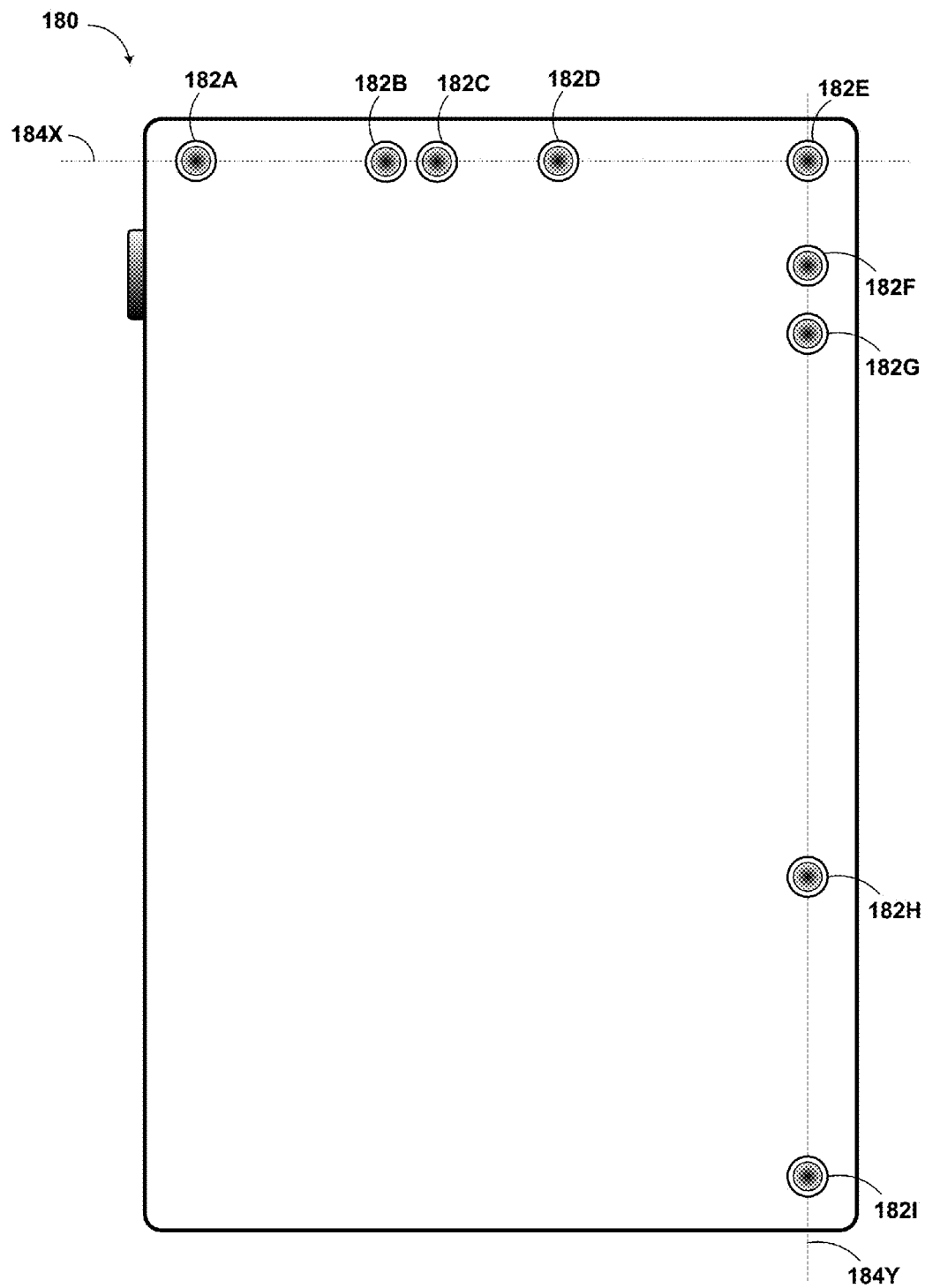
FIG. 1E shows another digital camera device with a multi-camera arrangement, in accordance with an example embodiment.

In another variation, FIG. 1E shows an arrangement with nine cameras 182A to 182I facing in the same direction. In FIG. 1E, the nine cameras 182A to 182F are placed on the back of the mobile device 180 along two axes 184X and 184Y. Accordingly, different pairs of cameras may be selected from cameras 182A to 182F to provide a number of different baselines along the two axes 184X and 184Y, as well as a number of different off-axis baselines.

It is contemplated that other multi-camera arrangements may include more or fewer cameras than those shown in FIGS. 1A to 1E. In addition, the lenses in a multi-camera arrangement may be oriented at a different angle with respect to the surface on which the lenses are arranged. Yet further, it should be understood that multi-camera arrangements may be implemented on other sides of a digital camera device. Other variations on the multi-camera arrangements shown in the figures are also possible.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or one or both of rear-facing cameras 112A and 112B, or an image that could be captured or was recently captured by any one of or any combination of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing cameras 112A and 112B may be similarly or differently arranged. Additionally, front-facing camera 104, each rear-facing camera 112A and 112B, or any combination of these cameras, may in fact be an array of one or more cameras (or an array of lenses that direct light onto a common image sensor).

Any one or any combination of front facing camera 104 and rear-facing cameras 112A and 112B may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Any one or any combination of front facing camera 104 and rear-facing cameras 112A and 112B may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure setting of an associated camera, or to help in this determination.

Digital camera device 100 could be configured to use multi-element display 106 and either front-facing camera 104 or one or both of rear-facing cameras 112A and 112B to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

B. Illustrative Device Components

Figure 2:
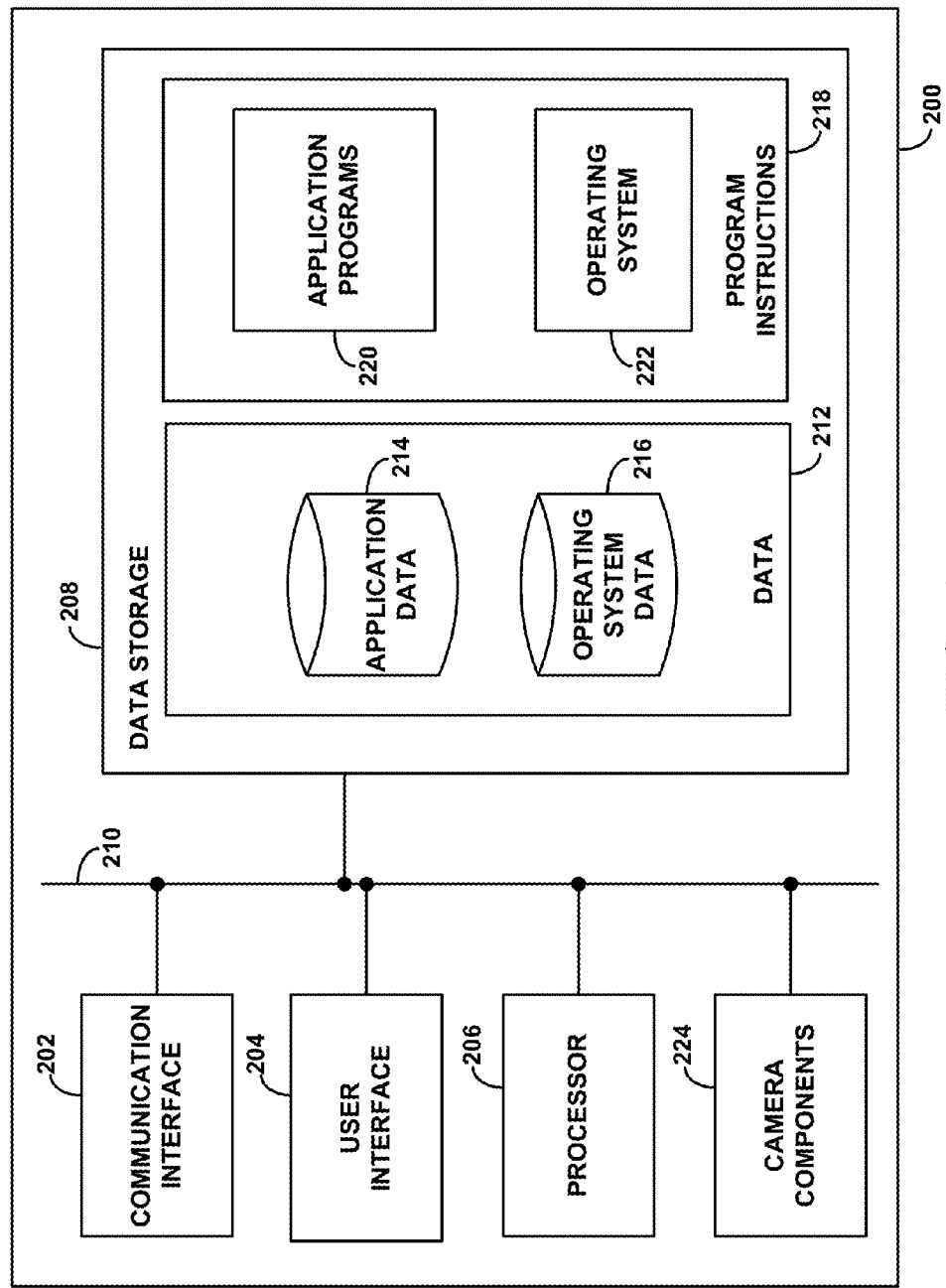
FIG. 2 is a simplified block diagram showing some of the components of an example computing device that may include camera components.

As noted above, the functions of digital camera device 100—or another type of digital camera—may be integrated into or take the form of a computing device, such as a mobile phone, tablet computer, laptop computer and so on. For purposes of example, FIG. 2 is a simplified block diagram showing some of the components of an example computing device 200 that may include camera components 224. Camera components 224 may include multiple cameras, such as cameras 112A and 112B.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206. Further, camera components 224 may include multiple camera systems, which each include an aperture, shutter, recording surface lens, image sensor, processor, and/or shutter button.

When multiple camera systems are included, there may be some components that are shared between the systems, and other components that are not shared. For example, each camera could include its own aperture, lens, and image sensor, while sharing other components such as a processor and a shutter button. As another example, each camera could include its own lens, but share the same image sensor. Alternatively, each camera system's components may be utilized only for that camera system, and not shared with other camera systems.

C. Digital Images

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different number of bits for pixel value representation (e.g., 10, 12, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

E. Autofocus

Generally, an autofocus (AF) system may include a sensor of some kind, a control system that automatically determines focus settings, and an actuator to adjust the mechanical components of the camera (e.g., the lens) according to the focus settings. The data provided by the sensor may be used to evaluate the manner in which the environment is or will be recorded by an image sensor, and to responsively control an electro-mechanical system that can change the focus of camera (e.g., by using an actuator to move components of the lens and/or changing the size of the aperture). Various types of autofocus techniques may be utilized by an image capture device, such as digital camera device 100.

Many consumer cameras include passive autofocus systems, which focus the lens on a subject by passively analyzing the image that is entering the optical system (e.g., they do not direct controlled beams of light on the subject in order to focus). Typical passive autofocus techniques include "phase detection" autofocus (PD-AF) and "contrast detection" autofocus (CD-AF), which may also be referred to as "contrast measurement" autofocus.

Passive autofocus processes typically involves a computing system (e.g., a processor) operating a mechanical lens system to adjust the focus setting(s) of the lens (e.g., to change the distance between a focusing element of the lens and the sensor), and then analyzing whether or not the resulting image from an autofocus sensor is in focus. If the resulting image is not satisfactorily in focus, then the computing system again adjusts the focus settings and evaluates the characteristics in the resulting image. In some implementations, each adjustment to the focus settings may be determined based on some measure of how out of focus the image is (or how out of focus a particular portion of the image is). In other implementations, the adjustments may be predetermined. In either case, this process may be repeated until the resulting image is deemed to be satisfactorily in focus.

As noted above, some cameras, such as DSLRs, may include dedicated autofocus systems, which may include one or more sensors that are dedicated to autofocus. Such cameras typically do not use the image sensor, which is used to capture images, for purposes of autofocus. Further, such cameras typically include PD-AF system, in which light received through the lens is split into a pair of images. Both of the images in the pair may then be directed onto the autofocus sensor and analyzed to determine whether or not the lens is in focus. The focus position of the lens may then be adjusted until proper focus is detected.

One common system PD-AF system is a through-the-lens, second-image registration, phase detection (SIR PD-AF) system. An SIR PD-AF system utilizes a beam splitter to direct incoming light towards an autofocus sensor. More specifically, micro-lenses that are located on opposite sides of the lens may direct light from coming from the opposite sides of the lens towards the autofocus sensor, which effectively creates a rangefinder, with two images being projected onto the autofocus sensor. The images formed by the two micro-lenses are then compared to determine a separation error, which is evaluated to determine whether the lens is focused correctly. If the separation error indicates that the subject is out of focus (e.g., if the separate error is not zero or within some threshold from zero), then an adjustment to the focus settings may be calculated based on the separation error, and the lens may be moved according to the adjusted settings (e.g., by moving the lens assembly or a lens element closer to or further from the sensor).

When size and/or cost of components are significant in the design of a device, the device may utilize a camera system that does not include a separate autofocus system. Such is the case with many mobile phones and/or tablet computers, which often include camera systems that use the same image sensor for both autofocus and image capture. In many cases, cameras in portable devices such as mobile phones and tablets use CD-AF for purposes of focusing.

While CD-AF systems can use a separate sensor that is dedicated to autofocus, most CD-AF systems use the same image sensor for both image capture and autofocus. CD-AF systems determine whether or not a subject is in focus by measuring the contrast in the image that is detected on the sensor. To do so, a CD-AF system may evaluate the change in contrast at various points in the image, with higher contrast being interpreted as an indication of a sharper image.

More specifically, the difference in intensity between adjacent pixels of a sensor is generally greater when the subject captured in the adjacent pixels is in focus, as compared to when image subject is out of focus. Further, a CD-AF system may measure the contrast at specific pixels, or determine the average over certain groups of pixels. In either case, a CD-AF system may then adjust focus settings until a threshold contrast is detected (and possibly until a maximum contrast is detected). For example, an illustrative CD-AF system may pass image data through a high pass filter, and adjusts the focus of the lens until the output from the filter exceeds a threshold (and possibly until the output of the filter is at its highest level).

Further, the focus setting for a scene may be defined as or otherwise indicate the distance between the focusing element of the lens and the sensor (e.g., the focus position) that results in proper focus. Further, the focus position is typically proportional to (or at least a function of) the distance to the subject or area of the scene that is being focused on. Note that herein, the distance between the lens and a particular subject or object may be referred to herein as the "object distance." As such, a computing system on a device may determine the object distance based on the focus position.

In an illustrative embodiment, a multi-camera device, such as those shown in FIGS. 1A to 1E, may use an autofocus process to help detect when one of its cameras is occluded by a near-field occluder, such as a finger or dirty lens. Specifically, and as will be described in greater detail below, the inability or reduced ability of a first camera to properly focus on a scene, when a second camera on the same device is able to properly focus on the same scene, may be an indication that the lens of the first camera is occluded.

III. ILLUSTRATIVE METHODS

Figure 3:
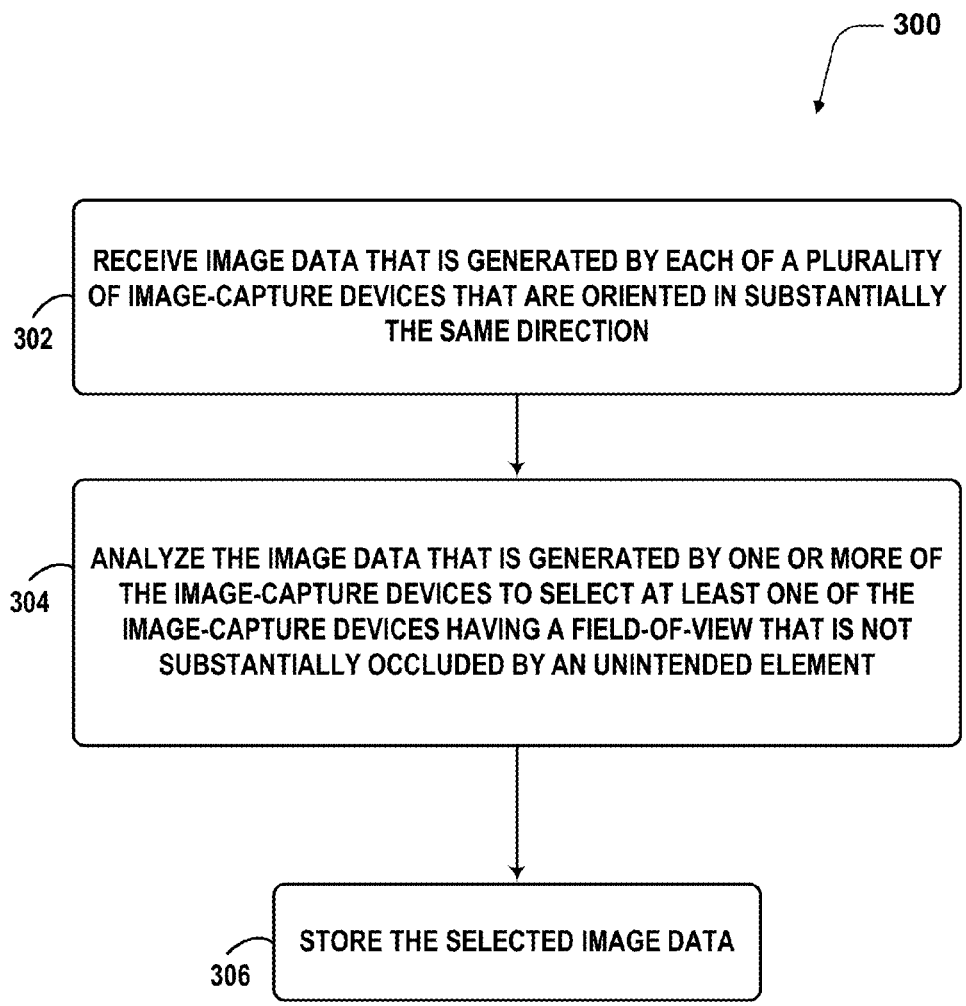
FIG. 3 is a flow chart illustrating a method, in accordance with an example embodiment.

FIG. 3 is a flow chart illustrating a method 300, according to an example embodiment. Method 300 may be implemented by a device that includes two or more cameras oriented in the same direction, where each camera is separated from the other cameras by some distance, such as the devices shown in FIGS. 1A to 1E. Such a device may implement method 300 in order to dynamically select and use image data from at least one camera, which provides a field of view of a scene that is not occluded or obscured by an unintended element (or at least that is captured by a camera that is less occluded than the device's other camera or cameras).

In particular, method 300 involves a computing device receiving image data that is generated by each of a plurality of image-capture systems that are oriented in substantially the same direction, as shown by block 302. The computing device may then analyze the image data that is generated by one or more of the image-capture systems to select image data from at least one of the image-capture systems having a field-of-view that is not substantially occluded by an unintended object, as shown by block 304. The computing device may then store the selected image data, as shown by block 306.

Note that in the event that no occlusion is detected in two or more image capture devices at the same time, the computing device may select image data from one of the two image-capture systems at random or based on some other criteria. Or, if the computing device determines that multiple images are not occluded, the computing device could store and/or use (e.g., by combining) the multiple images of the scene that were captured by multiple unoccluded image-capture systems.

Further, note that two image-capture systems should be considered to be oriented in substantially the same direction when the fields of view of the lenses of both image-capture systems are directed in substantially the same direction, such that both image-capture systems can capture an image of substantially the same scene without having to significantly rotate or re-position the device. As such, two image-capture systems should be considered to be oriented in substantially the same direction when components other than the lenses, such as sensors, motors, and so on, are not oriented in the same direction.

A. Selecting Image Data from an Image-Capture System Having a Field-of-View that is not Substantially Occluded Further, the computing device may use various techniques to select an image-capture system at block 304. In some embodiments, at block 304, the computing device may analyze and compare image data from multiple image-capture systems in order to select a particular image-capture system. For instance, the computing device may analyze the image data that is generated by each of two or more image-capture systems, and determine an individual occlusion indication for the image data from each device. The computing device may then select image data from one of the image-capture systems based at least in part on a comparison of the determined occlusion indications for the image-capture systems.

Various types of occlusion indications may be utilized in an example method. Some examples of occlusion indications will now be described in greater detail.

i. Sharpness as an Indication of Near-Field Occlusion

In some embodiments, a computing device may use image sharpness as an indication of whether or not image data from a particular camera is occluded by an object near to the lens. The sharpness of an image may indicate various types of occlusion, such as a dirty lens or a lens being substantially covered by the user's finger or another object located near the lens.

In such an embodiment, the computing device may determine a separate sharpness measure for the image data captured by each of the two or more image-capture systems. The computing device may then compare the respectively-determined sharpness measures and, based on the comparison, select the image data that was captured by one of the two or more image-capture systems. For instance, a computing device may determine that the lens of a given image-capture system is occluded, if an image of a scene that is captured by at least one other image-capture system is substantially sharper than an image of the same scene that is captured by given image-capture system. Note occlusion may be detected based on a substantial difference in the overall sharpness of images captured by different cameras on the same device, or may be detected based on a substantial difference in the sharpness in a particular area of the image frame (e.g., indicating partial occlusion of the lens).

In some embodiments, to compare sharpness, the computing device may compare the spatial frequency content of images of a scene captured by different cameras. For example, a computing device may determine a respective frequency-domain representation of each image (e.g., by determining the Fourier transform of each image). The computing device may then compare the respective frequency-domain representations corresponding to the two or more image-capture systems to determine whether or not the frequency-domain representation of an image that is captured by one of the image-capture systems on a device indicates a substantially lesser amount of high and/or middle frequencies than the image or images from one or more of the other image-capture systems on the device. If the frequency-domain representation of the image data from a given one of image-capture systems indicates a substantially lesser amount of high and/or middle frequencies, then the lens of this image-camera system may be deemed to have near-field occlusion. And, when one or more of the image-camera systems are determined to have such near-field occlusion, the image data from one of the other image-capture systems may be selected.

Otherwise, if the amount of high frequencies in the frequency-domain representation is substantially the same across images captured by all the image-capture systems, then this may be an indication that none of the image-capture systems have a lens that is occluded. In such case, the computing device may randomly select the image data from one of the two or more image-capture systems on the device, or select image data from one of the image-capture systems based on other criteria. In either case, the selected image data may be stored or otherwise used, such as by combining the image data with other selected image data to generate a stereoscopic image.

Note that in practice, when a lens is clean and is not occluded by an object near to or on the lens, an image that is captured by the lens will typically have a greater amount of high-frequency content. More specifically, dirty lenses typically cause blurring in captured images, which decreases the amount of high frequencies in a frequency-domain representation of such images. Further, near-field occluders such as a user's finger are typically out of focus, as a result of being closer to the lens than the minimum focusing distance of the lens. Frequency-domain representations of such out-of-focus images also have a lesser amount of high-frequency content (at least in the regions of the image frame where the occluder is present). Further, near-field occluders are often lit quite differently from the rest of the scene; either much darker, such as when a finger is held against the lens, or much brighter, such as when a finger close to the lens is illuminated by a flash and prevents a substantial portion of the light from the flash from illuminating the rest of the scene. Such bright or dark or regions typically result in saturated pixels (either dark or bright), which in turn result in a lesser amount of high frequencies in the frequency-domain representation of such images. Accordingly, by identifying when an image-capture system captures an image with a comparatively lesser amount of high-frequency content, a computing device may be able to avoid using an image, and/or storing an image in a more permanent manner (such as in a user's photo album, when the image is captured with a dirty lens and/or with a lens that is occluded by, e.g., the user's finger.

Note that a computing device could also detect a near-field occluder, such as a finger over the lens, by searching of for a mismatch in lower frequency content between images captured by different cameras on the device. In particular, when a near-field occluder is present in one image of a scene, but not in another image of the same scene, the image with the near-field occluder will have substantially different content than the image without it. As a result, a near-field occluder may be detected when there is a significant (e.g., greater than a threshold) mismatch between images in lower spatial frequencies.

Further, note that while the above comparisons of sharpness are described as being carried out in the frequency domain, such sharpness comparisons could also be performed in the spatial domain. For example, a spatial-domain measure of image sharpness may be determined by applying an edge-detection process (e.g., based on contrast) to an image, and then determining a pixel density of the average edge. In a further aspect, the edge-detection technique may be performed solely or additionally on one or more lower-resolution versions of the image in order to measure the contrast at lower spatial frequencies. Yet further, in the context of edge detection, contrast may be measured, and edges detected based thereon, across the entire image, or just within a certain portion or portions of the image.

Other techniques for determining and/or comparing sharpness are also possible. Further, there are many techniques for determining sharpness in the spatial domain, and in the frequency domain, which are well known in the art. It is contemplated that any such technique might be utilized. Further, note that if the sharpness comparison is implemented in the spatial domain, it may be desirable to register the contents of one of the image with the others, before evaluating sharpness.

ii. Differences in Subject Matter as an Indication of Occlusion

In some embodiments, image data from each of two or more image-capture systems on the same device may be analyzed to determine whether image data from either system includes an object or objects that are believed to be unintended elements, such as a finger. In such an embodiment, occlusion may be measured in a binary fashion; e.g., by determining either that an unintended element is or is not present in the image data from a camera. Accordingly, block 304 may further involve identification of an unintended element or subjects in image data from one or more image capture devices (and a determination that the unintended element or subjects is not included in the image data from one or more of the other image capture systems on the device).

The identification of an unintended element may be accomplished in various ways. For instance, when a very close object occludes a given camera's field of view, such as when a finger is over the lens of the given camera, it is likely that the image from the given camera will include a large subject (e.g., the finger), which is missing or occupies a much smaller portion of the frame in image data from another camera. Accordingly, a subject may be classified as unintended by comparing the image data from two or more cameras.

For instance, when a computing device determines that the image data generated by a first of its image-capture systems includes a first subject (that perhaps occupies at least a predetermined percentage of the image frame), which is not included in the image data from one or more others of the image-capture systems, it may select image data that is captured by another one of its image-capture system(s), which the does not include the first subject.

In some instances, an unintended element may be detected in a more granular manner, such as by determining the percentage of the image frame that is occupied by an unintended element or subjects. In such an embodiment, the computing device may select an image-capture system for which the occlusion indicator indicates the least occlusion of the field of view by an unintended element (and hopefully indicates no occlusion whatsoever), as compared to the images captured by one or more of the device's other image-capture systems.

iii. Auto-Focus Results as an Indicator of Occlusion

In some embodiments, the ability of an image-capture system to focus on the scene may be an occlusion indication. In particular, when an object such as a finger is covering or very close to the lens of an image-capture system, the image-capture system may have difficulty or be unable to achieve proper focus. Accordingly, the inability to focus using a particular image-capture system may be interpreted as an indication that the lens of the image-capture system is occluded.

Accordingly, at block 304, each of two or more cameras on the same device could separately implement an auto-focus process, at substantially the same time, in an effort to focus on a scene. Then, if a given one of the cameras is unable to achieve proper focus, while one or more other cameras are able to achieve proper focus on the same scene, this may be interpreted as an indication that the lens of the given camera is occluded by an unintended element. Similarly, if a given one of the cameras is focused on a scene, but there is a significantly lower confidence in the given camera's focus setting (as compared to the focus settings of other cameras on the device), this may also be interpreted as an indication that the lens of the given camera is occluded by an unintended element. Accordingly, image data from another device may be selected and stored at block 306.

Further, in some embodiments, auto-focus results may be used as a preliminary test for occlusion, before any image data is captured. For example, a computing device may first run an auto-focus test on some or all of the device's cameras, and only capture image data of a scene with cameras that are able to achieve proper focus on the scene. The captured images, which in this case could be from a subset of a device's two or more camera systems, may then be evaluated by, e.g., comparing the frequency-domain representations of the captured images, in order to select and store image data that is not occluded.

Note that in the above-described embodiment and others, power consumption may be reduced when only unoccluded image data is captured and/or stored. More specifically, if an occluded camera is identified quickly, such as while carrying out an auto-exposure or AF process, then this camera may be powered down, which in turn may conserve battery power.

iv. Auto-Exposure Results as an Indicator of Occlusion

In some embodiments, differences in the auto-exposure results of two different image-capture systems may indicate that the lens of one of the image-capture systems was occluded. In particular, when an image is captured while an object such as a finger is covering the lens of an image-capture system, the portion of the image where the lens is covered may be dark, which may result in an image where the percentage of pixels in an acceptable exposure range may be reduced. Accordingly, if the image of a scene captured by a given one of a device's cameras has a substantially worse and/or significantly different exposure than an image of the same scene capture by another one of the device's cameras (e.g., as indicated by respective histograms of image data of the scene from each camera), this may be interpreted as an indication that the lens of the given camera is occluded.

Accordingly, at block 304, each of two or more cameras on the same device could implement the same auto-exposure to determine the exposure for a scene at substantially the same time. The auto-exposure process may provide an indication of the percentage of pixels that are properly exposed (e.g., within an acceptable exposure range). Accordingly, if the percentage of properly exposed pixels by a given one of a device's cameras is less than the percentage of properly exposed pixels by one or more of a device's other cameras by at least a threshold percentage difference, then the given camera may be deemed to be occluded.

Further, in some embodiments, an exposure comparison may be used as a preliminary test for occlusion, before any image data is captured. For example, a computing device may first run an auto-exposure process on some or all of the device's cameras, and only capture image data of a scene with cameras that are not considered to be occluded based on a comparison of the exposures achieved by the different cameras. The captured images, which in this case could be from a subset of a device's two or more camera systems, may then be evaluated by, e.g., comparing the frequency-domain representations of the captured images, in order to select and store image data that is not occluded.

v. Consideration of Multiple Factors to Detect Occlusion

In a further aspect, a multi-camera device may consider a combination of two or more factors in an effort to select an image-capture system (and/or image data therefrom) that is not occluded by a near-field object. For example, a multi-camera device may consider two or more occlusion indicators, such as: (a) difference(s) in frequency-domain representations of image data from different camera systems (e.g., identifying occlusion when an image has substantially less high-frequency content), (b) difference(s) in spatial-domain representations of image data from different camera systems, (c) difference(s) in subject matter between the images of a scene captured by different image-capture systems on the device, (d) auto-focus results of different cameras on the device, and/or (e) differences in the exposures of scene that are achieved by different cameras on the device. Other factors may also be considered.

In a further aspect, when auto-exposure, autofocus, and/or contrast-detection processes from two cameras have significantly different results, it may be difficult to tell which camera is occluded, if there aren't additional cameras such that an outlier can be identified. In this scenario, when two cameras have significantly different results from auto-exposure, auto-focus, and/or contrast-detection processes, other factors may be considered in order to select a camera that is not (or is less) occluded. For example, to determine which of the two cameras is not occluded, a device may then compare difference(s) in frequency-domain representations of image data from different camera systems (e.g., identifying occlusion when an image has substantially less high-frequency content), difference(s) in spatial-domain representations of image data from different camera systems, or difference in histograms of image data captured by the two cameras. Other examples are also possible.

B. Iterative Evaluation of Camera Systems

The examples of method 300 described above generally involve a computing device receiving image data of a scene from two or more of the device's cameras, and detecting occlusion by comparing various characteristics of the image data captured by the different cameras. In other implementations, the computing device may iteratively analyze image data from one camera at a time, and select image data from the first camera for which the device determines that the field-of-view is not occluded (or possibly for which it is determined that the field of view is occluded by less than some threshold amount). In such an embodiment, the computing device may, by default, try to use a first camera, and only resort to use of another camera if the first camera is occluded.

Figure 4:
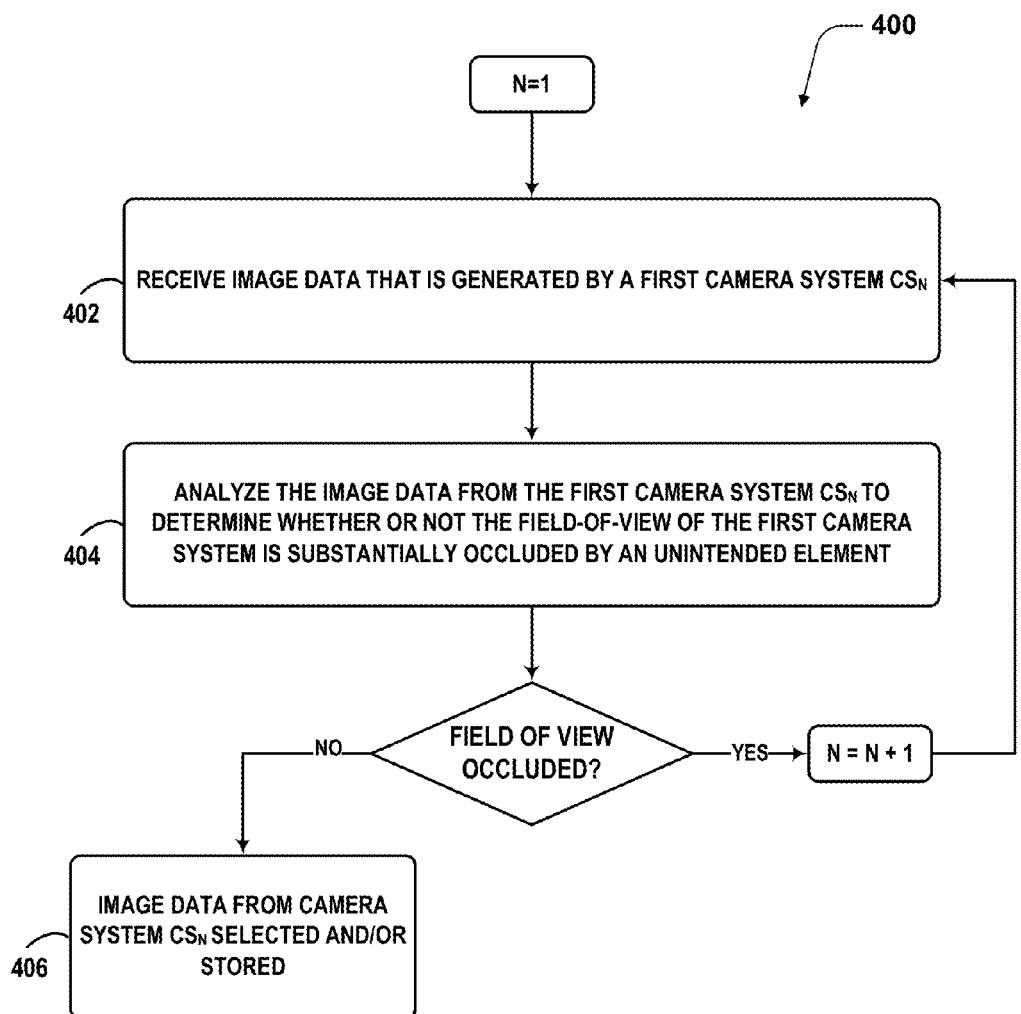
FIG. 4 is a flow chart illustrating another method, in accordance with an example embodiment.

For example, FIG. 4 is another flow chart illustrating a method 400, according to an example embodiment. Method 400 may be implemented by a computing device with multiple camera systems to iteratively test its image-capture systems for occlusion, and to select and store image data from the first non-occluded image-capture system.

More specifically, at block 402, during a first iteration of method 400, a computing device with n camera systems ($CS_{i=1\ to\ n}$) may receive image data that is generated by a first camera system $CS_1$. Further, at block 404 of the first iteration, the computing device may analyze the image data from the first camera system $CS_1$ to determine whether or not the field-of-view of the first camera system is substantially occluded by an unintended element (e.g., a near-field subject such as a finger). If the field-of-view of the first camera system $CS_1$ is not substantially occluded by an unintended element, then image data from first camera system may be selected and stored, as shown by block 406.

Otherwise, if the field-of-view of the first camera system $CS_1$ is deemed to be occluded, then the computing device may repeat blocks 402 and 404 for the other camera systems $CS_2$ to $CS_n$, one at a time, until image data from one of the image-capture systems $CS_2$ to $CS_n$ is determined to have a field-of-view that is not substantially occluded by an unintended element. Alternatively, even if the field-of-view of the first camera system $CS_1$ is deemed to be sufficiently occluded, such that additional camera systems should be evaluated, the image data from $CS_1$ may be kept, at least until another camera system is deemed to be less occluded in a subsequent iteration of method 400.

C. Selection of Camera Pairs for Stereoscopic Imaging

In some implementations, an example method, such as method 300 or 400, may be implemented to select a pair of cameras from three or more cameras on the same device, with which to capture stereo image data. For example, at block 304 of method 300, a computing device analyze image data from two or more of the image-capture systems to select a pair of image-capture systems in which both of the individual image-capture systems have a field-of-view that is not substantially occluded by an unintended element. Then, at block 306, the computing device may operate the selected pair of image-capture systems to capture stereoscopic image data.

For example, a device such as that shown in FIG. 1D or 1E may capture images of a scene with three or more of its rear-facing cameras (e.g., three or more of cameras 166A to 166F, or three or more of cameras 182A to 182I). The device may then use various techniques, such as those described above in reference to block 304, to identify which images, if any, are occluded. The device may then evaluate unoccluded image pairs to select a stereo image pair to store or use (e.g., by combining).

Note that if there are only two images of the scene that are unoccluded, then these two images may be the only images that can be stored as a stereo image pair. However, if there are three or more unoccluded images of the scene, then two or more stereo image pairs may be formed from the unoccluded images. In such case, additional factors may be considered to select a given pair of unoccluded images. For example, the device could determine the distance(s) to objects in the scene, and select an image pair from cameras that provide a baseline that is most suited for capturing stereo imagery of objects at the determined distance(s). Additionally or alternatively, the device could attempt to select images from a pair of cameras for which the baseline is as close to parallel with the ground as possible. Other factors may also be used to select a particular pair of unoccluded images to form a stereo image pair.

IV. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
  receiving, by a computing system, image data of a scene that is generated by each of a plurality of image-capture systems at substantially the same time, wherein the plurality of image-capture systems are all arranged on a given device and all are oriented in substantially the same direction;
  analyzing, by the computing system, the image data of the scene that is generated by two or more of the image-capture systems to select image data from at least one of the image-capture systems having a field-of-view that is not substantially occluded by an unintended element; and
  storing the selected image data;
  wherein selecting the image data from at least one of the image-capture systems comprises:
    determining a respective frequency-domain representation of the image data that is generated by each of the two or more image-capture systems; and
    comparing the respective frequency-domain representations corresponding to the two or more image-capture systems to determine whether or not the frequency-domain representation of image data from one of the two or more image-capture systems indicates a substantially greater amount of high frequencies, wherein the selection of the image data is based at least in part on the determination as to whether or not the frequency-domain representation of image data from one of the two or more image-capture systems indicates a substantially greater amount of high frequencies.

2. The method of claim 1, wherein the unintended element is at least one finger or at least a portion of a hand.

3. The method of claim 1, wherein the unintended element is one or more hairs.

4. The method of claim 1, wherein analyzing the image data that is generated by the two or more image-capture systems to select the image data from at least one of the image-capture systems further comprises:
(a) for each of the two or more image-capture systems, analyzing the image data that is generated by the image-capture system to determine an occlusion indicator; and
(b) based at least in part on a comparison of the respectively determined occlusion indicators for the two or more image-capture systems, selecting the image data that is generated by one of the two or more image-capture systems.

5. The method of claim 4, wherein selecting image data from one of the two or more image-capture systems based on the determined occlusion indicators for the image-capture systems comprises:
selecting one of the two or more image-capture systems for which the indicator is indicative of a field of view that is not occluded by any unintended element.

6. The method of claim 4, wherein selecting image data from one of the two or more image-capture systems based on the determined occlusion indicators for the image-capture systems comprises:
selecting one of the two or more image-capture systems for which the occlusion indicator is indicative of the least occlusion of the field of view by an unintended element, as compared to the one or more others of the two or more image-capture systems.

7. The method of claim 1, wherein analyzing the image data that is generated by the two or more image-capture systems to select the image data from at least one of the image-capture systems comprises:
determining a sharpness measure for each of the two or more image-capture systems;
comparing the respectively determined sharpness measures for the two or more image-capture systems; and
based at least in part on the comparison of the respectively determined sharpness measures, selecting the image data that is generated by one of the two or more image-capture systems.

8. The method of claim 1, wherein the selection of the image data from at least one of the image-capture systems comprises:
if the frequency-domain representation of the image data from one of the two or more image-capture systems indicates a substantially greater amount of high frequencies, then selecting the image data for which the frequency-domain representation indicates a substantially greater amount of high frequencies; and
otherwise, selecting the image data from one of the two or more image-capture systems.

9. The method of claim 1, wherein analyzing the image data that is generated by two or more of the image-capture systems to select at least one of the image-capture systems having a field-of-view that is not substantially occluded by an unintended element comprises:
(a) analyzing the image data that is generated by a first one of the image-capture systems to determine whether or not a field-of-view of the first image-capture system is substantially occluded by an unintended element;
(b) if the field-of-view of the first image-capture system is not substantially occluded by an unintended element, then selecting the first image-capture system; and
(c) otherwise, repeating functions (a) to (c) for a next of the image-capture systems.

10. The method of claim 1, wherein the plurality of image-captured devices comprises three or more image capture devices, the method further comprising:
analyzing the image data that is generated by two or more of the image-capture systems to select a pair of the image-capture systems that each have a field-of-view that is not substantially occluded by an unintended element; and
operating the selected pair of image-capture systems to capture stereoscopic image data.

11. An apparatus comprising:
a plurality of image-capture systems, wherein lenses of the image-capture systems are all arranged on a first surface of the apparatus and oriented in substantially the same direction; and
a control system configured to:
(a) receive image data that is generated by each of two or more of the plurality of image-capture systems;
(b) analyze the image data that is generated by two or more of the image-capture systems to select image data from at least one of the image-capture systems having a field-of-view that is not substantially occluded by an unintended element; and
(c) store the selected image data;
wherein selection of the image data from at least one of the image-capture systems comprises: (i) determining a respective frequency-domain representation of the image data that is generated by each of the two or more image-capture systems; and (ii) comparing the respective frequency-domain representations corresponding to the two or more image-capture systems to determine whether or not the frequency-domain representation of image data from one of the two or more image-capture systems indicates a substantially greater amount of high frequencies, wherein the selection of the image data is based at least in part on the determination as to whether or not the frequency-domain representation of image data from one of the two or more image-capture systems indicates a substantially greater amount of high frequencies.

12. The apparatus of claim 11, wherein the unintended element is at least one finger or at least a portion of a hand.

13. The apparatus of claim 11, wherein analysis of the image data that is generated by the two or more image-capture systems to select the image data from at least one of the image-capture systems comprises:
(a) for each of the two or more image-capture systems, analyzing the image data that is generated by the image-capture system to determine an occlusion indicator; and
(b) based on a comparison of the respectively determined occlusion indicators for the two or more image-capture systems, selecting the image data that is generated by one of the two or more image-capture systems.

14. The apparatus of claim 11, wherein, to select the image data that is generated by one of the two or more image-capture systems, the control system is configured to:
determine a sharpness measure for each of the two or more image-capture systems;
compare the respectively determined sharpness measures for the two or more image-capture systems; and
based on the comparison of the respectively determined sharpness measures, select the image data that is generated by one of the two or more image-capture systems.

15. The apparatus of claim 11, wherein to select the image data from at least one of the image-capture systems, the control system is further configured to:

if the frequency-domain representation of the image data from one of the two or more image-capture systems indicates a substantially greater amount of high frequencies, then select the image data for which the frequency-domain representation indicates a substantially greater amount of high frequencies; and otherwise, select the image data from one of the two or more image-capture systems.

16. A non-transitory computer readable medium having stored therein instructions executable by a computing device to cause the computing device to perform functions comprising:

receiving image data that is generated by each of a plurality of image-capture systems, wherein the plurality of image-capture systems are all arranged on a given device and all are oriented in substantially the same direction;

analyzing image data that is generated by one or more of the image-capture systems to select image data from at least one of the image-capture systems having a field-of-view that is not substantially occluded by an unintended element; and storing the selected image data;

wherein selecting the image data from at least one of the image-capture systems comprises:

determining a respective frequency-domain representation of the image data that is generated by each of the two or more image-capture systems; and comparing the respective frequency-domain representations corresponding to the two or more image-capture systems to determine whether or not the frequency-domain representation of image data from one of the two or more image-capture systems indicates a substantially greater amount of high frequencies, wherein the selection of the image data is based at least in part on the determination as to whether or not the frequency-domain representation of image data from one of the two or more image-capture systems indicates a substantially greater amount of high frequencies.

17. The non-transitory computer readable medium of claim 16, wherein the unintended element is at least one finger or at least a portion of a hand.

18. The non-transitory computer readable medium of claim 16, wherein analyzing the image data that is generated by the one or more image-capture systems to select the image data from at least one of the image-capture systems comprises:

determining a sharpness measure for each of two or more of the image-capture systems;

comparing the respectively determined sharpness measures for the two or more image-capture systems; and based on the comparison of the respectively determined sharpness measures, selecting the image data that is generated by one of the two or more image-capture systems.

19. A method comprising:

receiving, by a computing system, image data of a scene that is generated by each of a plurality of image-capture systems at substantially the same time, wherein the plurality of image-capture systems are all arranged on a given device and all are oriented in substantially the same direction;

analyzing by the computing system, the image data of the scene that is generated by two or more of the image-capture systems to select image data from at least one of the image-capture systems having a field-of-view that is not substantially occluded by an unintended element; and storing the selected image data;

wherein selecting at least one of the image-capture systems having a field-of-view that is not substantially occluded by an unintended element comprises:

determining that the image data generated by a first of the image-capture systems includes a first subject that is not included in the image data from one or more others of the image-capture systems; and selecting one of the other image-capture systems from which the image data does not include the first subject.

* * * * *